(12) United States Patent
Chiba

(10) Patent No.: US 7,534,351 B2
(45) Date of Patent: May 19, 2009

(54) PRESSURIZED BIOLOGICAL WASTE WATER PURIFICATION PROCESS

(75) Inventor: Kousuke Chiba, 5-32, Ohsawa 1-chome, Mitaka-shi, Tokyo 181-0015 (JP)

(73) Assignees: C & R Co., Tokyo (JP); Kousuke Chiba, Tokyo (JP)

( * ) Notice: Subject to any disclaimer, the term of this patent is extended or adjusted under 35 U.S.C. 154(b) by 391 days.

(21) Appl. No.: 10/586,487

(22) PCT Filed: Mar. 22, 2004

(86) PCT No.: PCT/JP2004/003874

§ 371 (c)(1), (2), (4) Date: Jul. 20, 2006

(87) PCT Pub. No.: WO2005/090243

PCT Pub. Date: Sep. 29, 2005

(65) Prior Publication Data

US 2008/0223782 A1    Sep. 18, 2008

(51) Int. Cl.
*C02F 3/00* (2006.01)

(52) U.S. Cl. .................. 210/615; 210/616; 210/620

(58) Field of Classification Search ......... 210/615–616, 210/620
See application file for complete search history.

(56) References Cited

U.S. PATENT DOCUMENTS 3,928,190 A * 12/1975 Bebin ................. 210/618
3,968,035 A * 7/1976 Howe ................. 210/621

(Continued)

FOREIGN PATENT DOCUMENTS

JP    48-32237    4/1973

(Continued)

OTHER PUBLICATIONS

Hirota, et al, "Magnetic field effect on the kinetics of oxygen dissolution into water," Materials Transactions, 2000, vol. 41, No. 8, pp. 976-980.*

(Continued)

*Primary Examiner*—Chester T Barry
(74) *Attorney, Agent, or Firm*—Wenderoth, Lind & Ponack, L.L.P.

(57) ABSTRACT

There is provided a reaction system capable of, in the feeding of liquid stored after gas-liquid mixing into waste water to be treated of a reaction tank, conditioning the interior of the reaction tank to a pressurized state so as to simultaneously accomplish enhancement of utilization efficiency of gas phase and further reduction of the amount of excess sludge generated. There is further provided a biological purification process characterized in that microorganisms fulfill purification activity in a pressurized reaction tank having a pressure other than deep water pressure applied thereto. Preferably, together with water to be treated, reactant gas such as pure oxygen, ozone-containing oxygen (ozonized oxygen) or air is fed into the pressurized reaction tank. With respect to gas and liquid fed into the reaction tank, preferably, reactant gas is fed in the form of dissolved gas or microbubbles by means of a gas-liquid mixing unit (line atomizer). Preferably, the pressurized reaction tank is fitted with a support for microorganisms as means for increasing the habitant density of microorganisms engaging in reaction and retaining such microorganisms.

4 Claims, 2 Drawing Sheets

U.S. PATENT DOCUMENTS

| | | | | |
|---|---|---|---|---|
| 4,009,099 A | * | 2/1977 | Jeris | 210/612 |
| 4,009,105 A | * | 2/1977 | Jeris | 210/107 |
| 4,192,742 A | * | 3/1980 | Bernard et al. | 210/614 |
| 4,749,527 A | * | 6/1988 | Rasmusen | 261/76 |
| 4,921,604 A | * | 5/1990 | Moellenbeck | 210/151 |
| 5,151,187 A | * | 9/1992 | Behmann | 210/607 |
| 5,316,682 A | * | 5/1994 | Keyser et al. | 210/649 |
| 5,728,305 A | * | 3/1998 | Hawkinson | 210/760 |
| 5,961,830 A | * | 10/1999 | Barnett | 210/603 |
| 6,752,926 B2 | * | 6/2004 | Christodoulatos et al. | 210/617 |
| 7,105,092 B2 | * | 9/2006 | Chiba | 210/620 |

FOREIGN PATENT DOCUMENTS

| | | |
|---|---|---|
| JP | 2004-50092 | 2/2004 |

OTHER PUBLICATIONS

Chen, et al., "Application of gas-inducing reactor to obtain high oxygen dissolution in aeration process," Water Research, 37 (2003) pp. 2919-2928.*

* cited by examiner

F I G. 1
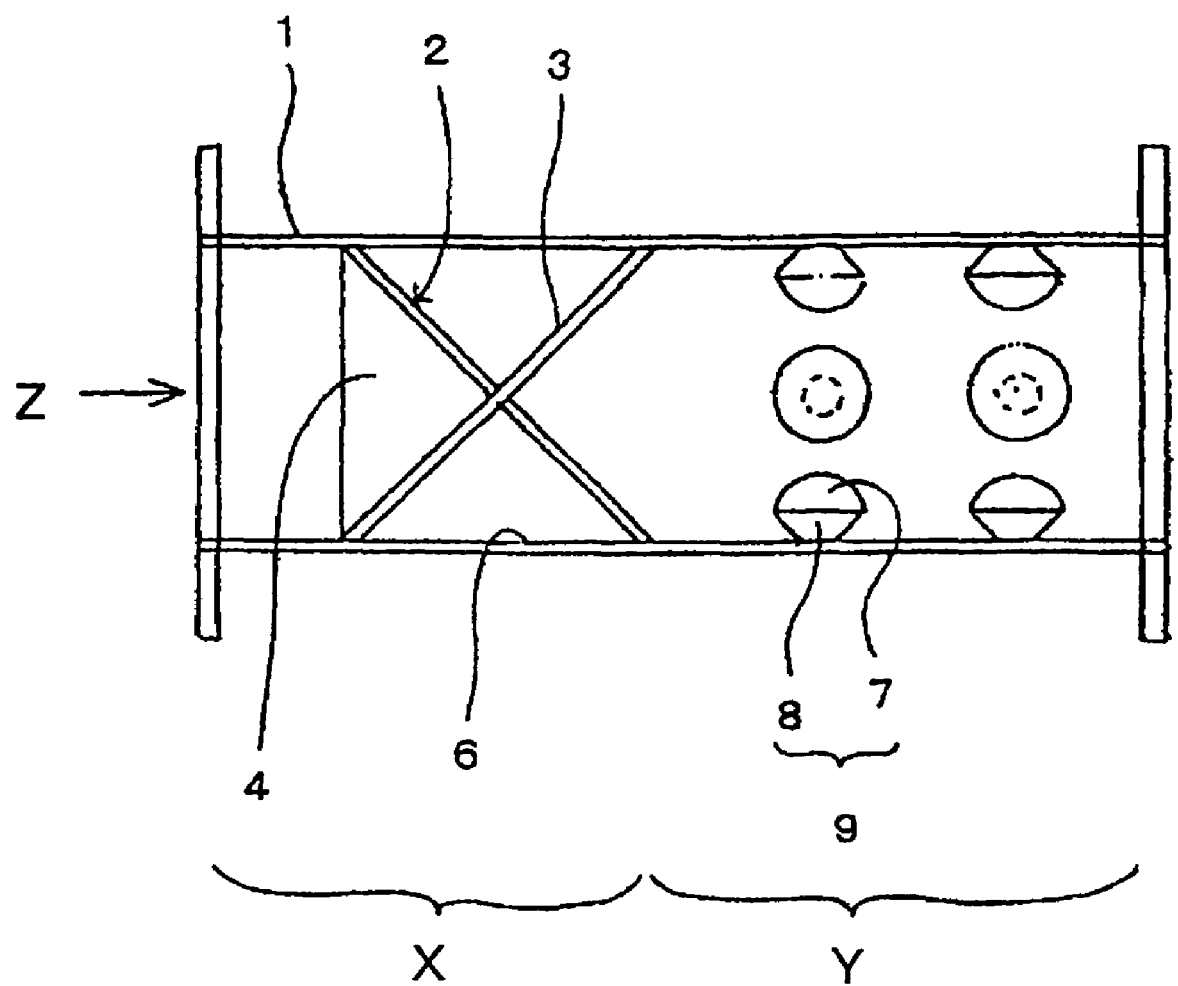

PRESSURIZED BIOLOGICAL WASTE WATER PURIFICATION PROCESS

TECHNOLOGICAL FIELD

The present invention relates to the technical field of biological waste water purification, as typified by the activated sludge method, and to the technical field of increasing the amount of gas dissolved in a biological reaction vessel through pressurization.

BACKGROUND ART

Biological treatments, as typified by the activated sludge method, are widely used in the purification of waste water. In the activated sludge method, the biological treatment uses microorganisms and oxygen to immobilize organic polluting substances in the waste water into an activated sludge, which is partly removed by decomposition into water and carbon dioxide (self-digestion).

The presence of dissolved oxygen in the reaction system is essential in biological waste water purification processes, such as the activated sludge method and the like, and often the supply of dissolved oxygen to the reaction system is the rate-determining condition.

Air has been used as an air disperser unit (bubbling) in order to promote biological reactions in the reaction system. The utilization efficiency of oxygen, however, was very low because the size of the gas bubbles introduced by the air disperser unit into the treated water was very large, so that most of the gas rapidly rose up through the treated water to be dissipated from the water surface.

Accordingly, there have been attempted to replace aeration schemes using standard air with aeration schemes using oxygen-enriched air or pure oxygen, to increase thereby the aeration volume. The dissolution efficiency of air or the like in conventional aeration technologies ranges ordinarily from 5 to 6%, and is at best of about 10%.

Upon dissolving a poorly soluble reactive gas such as oxygen gas or the like in a solution, as is known, increase of the pressure results in an increased amount of the gas dissolved. In conventional reaction vessels, as a rule, biological reactions take place under atmospheric pressure, so that the only pressure-contributing factor is the water depth pressure in the reaction vessel (usually, a pressure of about 0.05 MPa for an effective water depth of 5 m).

Increasing the depth of the vessel (tank) has also been attempted as a way of exploiting the water depth pressure of the vessel. Deep shafts reaching depths of 40 to as great as 150 m have been studied in this regard.

In order to bring oxygen gas (air) bubbles to such depths, however, it is necessary to increase to 2 m/sec or greater the flow velocity of the water to be treated that descends into the deep shaft to resurface again, which increases power consumption for aeration; moreover, the scarcity of suitable locations where strata (bedrock) are free of water leak concerns, and the large construction costs that must be incurred for reaction vessel installation have curtailed the widespread use of such deep shafts, despite oxygen gas utilization rates of 90% that can be realized thereby.

Although the pressurized reaction vessel approach has not been ruled out, it has not been adopted because the improved effect of pressurization has limitations as regards cost effectiveness, given the oxygen (air) utilization rates in the current state of the art of aeration technology, and because of the enormous costs involved in providing air-tightness/pressure-resistance to reaction vessels in public sewerage facilities, where the daily inflow can reach from tens to hundreds of thousands of tons, with loadings of about 10 tons/$m^2$ generated by water depth pressures of 0.1 MPa in ordinary reaction vessels.

Ozone is also used as a means for reducing the volume of excess activated sludge in waste water treatment systems employing the activated sludge method (see Japanese Examined Patent Application Publication No. H05-85236, Japanese Patent Application Laid-open No. H06-206088, Japanese Examined Patent Application Publication No. S57-19719).

Even so, gas-phase solubility/dispersibility in liquids are much the same as those of conventional aeration technology.

The present inventor previously invented a waste water purification process by the activated sludge method, in which a gas is dispersed and held in a liquid in the form of (ultra)fine bubbles (see Japanese Patent Application No. 2002-212598).

Herein, dispersing and holding of a gas in a liquid in the form of (ultra)fine bubbles using a stirring device (see Japanese Patent Application Laid-open No. H07-124577 or the like can improve dramatically gas solubility and dispersibility in a liquid, and enables to accomplish a gas-phase utilization of nearly 100%. However, activated sludge reaction systems are operated, as a rule, as a open system under the atmospheric pressure, and necessitate therefore further improvement as regards reducing the amount of excess sludge produced as a result of the waste water cleaning action.

Patent Document 1: Japanese Examined Patent Application Publication No. H05-85236

Patent Document 2: Japanese Patent Application Laid-open No. H06-206088

Patent Document 3: Japanese Examined Patent Application Publication No. S57-19719

Patent Document 4: Japanese Patent Application No. 2002-212598

Patent Document 5: Japanese Patent Application Laid-open No. H07-124577

DISCLOSURE OF THE INVENTION

Carrying out a biological waste water cleaning reaction under pressure could remarkably increase the gas-phase utilization and could improve reduction of excess sludge produced as a result of the waste water cleaning action.

An object of the present invention is to provide a reaction system such that, when a liquid having a gas-liquid mixture stored therein is led into waste water to be treated inside a reaction vessel, pressurizing the interior of the reaction vessel enables to simultaneously accomplish an increase in the gas utilization efficiency and a further reduction in the excess sludge production.

The process of biological cleaning of waste water under pressurization according to the present invention is a biological cleaning method of waste water in which waste water is cleaned biologically using the cleaning function exhibited by the microorganisms through an oxidation reaction and/or a reduction reaction, characterized in that the microorganisms exhibit the cleaning function in a pressurized reaction vessel to which a pressure is applied other than the water depth pressure. Preferably, to said pressurized reaction vessel are supplied the water to be treated together with a reactive gas from among pure oxygen, ozone-containing oxygen (ozonized oxygen), air, oxygen-enriched air, ozone-containing air (ozonized air) and ozone-containing (ozonized) oxygen-enriched air, as a dissolved gas or as fine bubbles; herein, the reactive gas of the gas-liquid supplied to said reaction vessel is supplied having been brought beforehand into a dissolved state and/or into a fine-bubble state by a gas-liquid mixing unit (line atomizer), while, in addition, said pressurized reaction vessel is provided with a support for microorganism as a means for increasing the habitant density of the microorganisms involved in the reaction and causing the microorganisms to be retained.

BRIEF DESCRIPTION OF THE DRAWING

FIG. 1 is an explanatory diagram illustrating an example of a gas-liquid mixer which can be suitably used as the atomizer in the present invention.

BEST MODE FOR CARRYING OUT THE INVENTION

Figure 2:
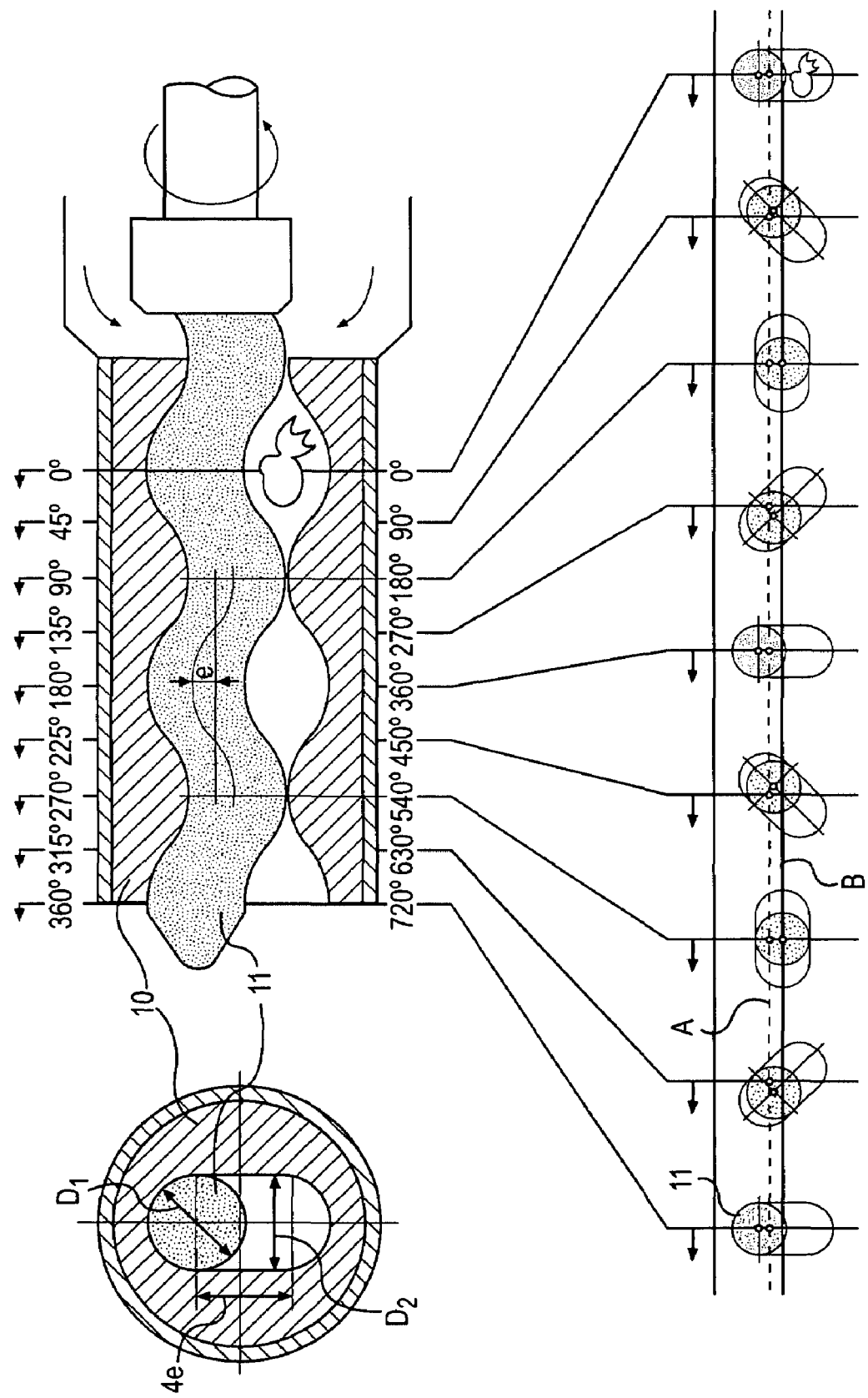
FIG. 2 is an explanatory drawing illustrating an example of the gas-liquid pressure-transfer pump optimally used in the present invention.

The present invention involves basically using the line atomizer disclosed in detail in Japanese Patent Application No. 2002-212598 (U.S. Pat. No. 7,105,092 is the English language equivalent) to dissolve in a liquid, in a high concentration, an oxygen-containing gas and/or an ozone-containing gas, and using gas-storage gasified solution technology for direct gasification of a solution of treatment waste water in a high-pressure reaction vessel, or for supplying a high-pressure gasified solution to the waste water under treatment, promoting thereby the biological reactions and/or chemical reactions so as to decompose organic substances in the waste water into gases and water to the highest extent possible.

The invention is explained in detail next.

In the present invention, the waste water for treatment may be any kind of waste water containing organic compounds that must be decomposed and removed including, for instance biological waste water, sewage, industrial waste water, stagnant water such as sludge or the like. The above applies also to seawater systems.

The pressurized reaction vessel may be a container capable of withstanding a pressure of about 0.3 to about 3 MPa. The pressurized reaction vessel may also be a pressurizable reaction tank or a pressurizable reaction column. The dimensions and design of the pressure reaction vessel are not particularly limited, and for instance a plurality of pressurized reaction vessels may also be arbitrarily arranged in parallel or in series, as the case may require. The structure of the reaction vessel may be that of a horizontally disposed single drum-type tank or that of a vessel comprising two or more tanks in combination.

The pressurizable reaction vessel is provided with an inlet for the starting waste water before treatment, an inlet for the gasified liquid and a discharge outlet for the discharged liquid after treatment. The starting waste water to be treated is introduced into the pressurizable reaction vessel by using a gas-liquid pressure-transfer pump, directly or via an atomizer. When the liquid is subjected to pressure reduction at a distance from the outlet port, the gas generated in the liquid by the reaction (carbon dioxide and others) is liberated from the discharged liquid.

The discharged liquid can be released toward outside of the system either as such or through a settling tank (pool) in a conventional manner. If necessary, however, the discharged liquid is released toward outside of the system after being subjected to the treatment as required. The gases generated in the reactions can be basically discharged outwardly but but, in some cases, as accompanied by a secondary treatment from the standpoint of preventing the global warming phemomenon.

The gas-liquid mixing unit (line atomizer system) preferably used in the present invention includes a gas-liquid pressure-feed pump capable of feeding a mixture of a gas and a liquid without occurrence of gas lock/air lock, an atomizer having a function for generating ultrasonic waves and cavitations, and a device for supplying oxygen and/or ozone.

As the atomizer, atomizers of any design can be used provided that they can work in mixing and dispersing a gas into a liquid in the form of fine (ultrafine) bubbles for holding.

As the atomizer may be used, for instance, a static-type mixer in a multistage arrangement or in a parallel arrangement for the respective functions. A preferred example of the atomizer is the "stirrer apparatus" used in an "ozone reactor" (Japanese Patent Application Laid-open No. H07-124577).

The stirrer unit (gas-liquid mixer) is as illustrated in FIG. 1.

In FIG. 1, the stirrer unit is constituted from a pair of semi-elliptical blade plates 2 of substantially identical forms, disposed at a fluid-inlet side Z of the tube 1 in such a fashion that the chord-side edges 3 of the blade plates 2 face each other and intersect symmetrically relative to the center axis of the tube; a triangular partition plate 4 dividing the cross section of the tube into two substantially equal blocks and obstructing the area between the chord-side edges 3 of the two blade plates 2 positioned to the fluid-inlet side Z from the intersection intersecting part; a flow-deflecting section X formed by fixedly bonding the arched edges of the blade plates (edges opposite to the chord-side edges 3 of the blade plates 2) to the inside surface 6 of the tube 1; and a reaction section Y formed of at least one protrusion 9 disposed radially relative to the axis of the tube 1 and formed integrally from a semi-spherical head part 7 having a head top directed to the axial direction of the tube, on the inner peripheral wall 6 of the tube 1 succeeding the flow-deflecting section X, and from a leg part 8 shaped as an inverse truncated cone.

If a gas and a liquid can be introduced into a gas-liquid mixer using a single machine, this stirrer device (also called an OHR line mixer) enables ultrafine bubbles having a bubble size of about 0.5 to 3.0 μm or even finer, from 1 nm to 1,000 nm, to become uniformly dispersed and mixed in a liquid in the short time that it takes to pass through the gas-liquid mixer.

Gases and liquids are pressure-fed to the atomizer using a gas-liquid pressure-feed pump. In this case, such a pump has preferably a pressure-feed capacity that does not decrease even when the mixing proportion of the gas is increased to 3% by volume or larger.

In ordinary liquid-feeding pumps, gas-lock or air-lock occurs when a gas is mixed with the liquid, which leads to a rapid decrease of the feeding capacity and to substantial failure of feeding when the mixed gas reaches 6 to 8% by volume.

It is preferable that the pump for pressure-feeding of a liquid mixed with a gas should be a gas-liquid pressure-feed pump which is not subject to a decrease in pressure-feed capacity even with an increased proportion of the gas. Such pumps include, for instance, "Mohno Pumps" marketed by Heishin Sobi Co.

As is illustrated in FIG. 2, the "Mohno Pump" is a metering feed pump of the type in which a spiral-like rotor 11, having a circular cross section and shaped as a large-pitch spiral, is rotated within a female screw-shaped gap space inside a stator 10 of oblong cross section and having a female screw-formed space bored therein, to cause successive movement of the gap space formed by the stator and the rotor and to transport thereby material in the gap space. The lower part of FIG. 2 illustrates the relationship between the bored space in the stator and the rotor at respective positions. As can be seen, one pitch of the bored space in the stator corresponds to two pitches of the rotor spiral. In the bottom part of FIG. 2, A denotes the rotation center axis of the rotor and B denotes the center axis of the stator.

By using the "Mohno Pump", a gas-liquid mixed fluid, of which the intermixed gas occupies a 90% by volume or smaller portion, can also be pressure-fed without suffering a decrease in pressure feeding capacity, so that the mixing proportion of the gas and liquid and the flow velocity thereof can be adjusted/varied freely. The feeding amount per unit time can be regulated by adjusting the rotation speed of the rotor. Reversed transfer can also be performed by reversing the rotation of the rotor.

Devices that can be utilized for supplying oxygen and/or ozone include ozone generators or the like capable of being adjusted for oxygen supply and for ozone generation. For example, an ozone generator may comprise herein an ozone-generating element with an electrode formed on a dielectric body and a high-frequency high-voltage power source capable of applying a high-frequency AC voltage to this ozone-generating element, such that, under supply of an oxygen-containing gas to the ozone-generating element, the voltage and/or frequency of the power source are manipulated by an adjuster to conduct regulation of the amount of ozone generation.

The ozone generator may also be an oxygen/ozone cycle generator for adjusting the supply amount of oxygen and ozone, with a process for mainly oxygen supply and a process for mainly ozone supply.

The reactive gas containing oxygen to be supplied can be air, oxygen-enriched air, or pure oxygen. If the amount of generated ozone is set to zero, the supplied gas may be fed as such, without any hanges.

Pressure may be applied to the liquid passing through the line atomizer. Pressure may optionally be applied before introduction of the gas into the liquid, by providing an appropriate pressurizer; also, pressure can be modified by varying the inlet and outlet diameters of the gas-liquid pressure-feed pump or by varying the inlet and outlet diameters of the atomizer.

Accordingly, dissolution of the gas into the liquid can be promoted thereby since, in general, the solubility of a gas is increased under high pressure.

As the liquid to which the gas is mixed can be used sludge water or supernatant water from a settling vessel (pool) of the waste water treatment system, or clean water from outside the system, or incoming starting waste water for treatment.

The gas-liquid mixture fluid resulting from mixing of a gas and a liquid in the line atomizer is introduced in the waste water for treatment. At the spot at which the gas-liquid mixture fluid is introduced, the mixture is introduced directly into the pressurized reaction vessel. When the gas supplied via the line atomizer is differentiated into gas containing mainly oxygen and gas containing mainly ozone, there may be provided plural pipes for introducing the respective gases into the pressurized reaction vessel.

In the atomizer, the desired gas is mixed under pressure with a solution to form ultrafine bubbles having a bubble size of 300 μm or smaller which increases the dissolving speed of the gas into the liquid to yield a dissolved gas, with the remaining gas in the form of ultrafine bubbles that can be dispersed/accumulated/stored to be fed, without further changes and under a high pressure, into the reaction vessel.

Dispersing/accumulating/storing and feeding the remaining gas in the form of ultrafine bubbles has the effect of rapidly replenishing the dissolved gas being consumed by the biological reactions and/or chemical reactions in the reaction vessel, as the ultrafine bubbles dispersed in the reaction vessel are turned into dissolved gas. This forestalls delay of the reaction caused by depletion of the dissolved gas.

The present invention may be used in existing or newly built facilities using biological waste water treatment methods such as the activated sludge method or the like. In the case of existing treatment facilities, the present invention can be easily implemented by installing a small pressurized-type reaction vessel (about $1/10$ to $1/100$ of the capacity of existing reaction vessels), a reaction tank and/or a reaction column (typified by a pressurized reaction vessel) at a suitable position in a part corresponding to an existing reaction vessel. That is, the pressurized reaction vessel is installed at a suitable location along the flow line of the biological waste water treatment facilities such as a facility using the activated sludge method or the like, then a gas-liquid of the waste water to be cleaned having mixed therein the reactive gas necessary for the reactions, such as pure oxygen, air or the like, is pressurized and fed into the reaction vessel, in order for the digesting/decomposing treatment to be carried out by the microorganisms living/supported in the pressurized vessel.

The present invention enables increase of the dissolved amount of poorly soluble reactive gases such as oxygen, air or the like, to greatly promote the activity/multiplication of the microorganisms affording thereby digestion/breakdown of soluble organic substances in the waste water within a shorter time. Using a pressurized reaction vessel, moreover affords a substantially compacted size of the waste water treatment facilities, thanks to a reaction vessel having about $1/10$ to $1/100$ times the volume of conventional reaction vessels that employs only water depth pressure (of about 0.05 MPa).

In the present invention, the reactive gas such as oxygen or the like necessary for the microorganisms is abundantly supplied to the pressurized reaction vessel in a dissolved state, at high concentrations, or as ultrafine bubbles; as a result, the effect of the invention can be substantially enhanced by providing a support for increasing the habitat density of the microorganisms. In the present invention, the support provided for increasing the habitat density of the microorganisms in the pressurized reaction vessel affords a dramatic reduction in the volume of the pressurized reaction vessel as compared with a reaction vessel not provided with such a support. Since a sufficient amount of microorganisms necessary for the reactions become adsorbed onto the interior of the support or the outer surface of the support, where they are growing, the microorganisms remain inside the pressurized reaction vessel without becoming washed away, which renders unnecessary the supply of microorganisms (activated sludge) by means of returned sludge, as in conventional cases.

The support used to increase the habitat density of the microorganisms may be, for instance, a support such as "Kuragel" or the like, with a PVA as a base material, and which enables to increase the microorganism density, increasing BOD removing capacity, and coping with high-loaded waste water.

As the case may require, the present invention enables to enhance decomposition of the activated sludge by supplying a gas containing ozone. In addition to the self digestion of the microorganisms, breakdown of activated sludge by ozone affords a large reduction in sludge generated from the reaction vessel, and might eventually preclude sludge generation.

The use of a pressurized reaction vessel in the present invention, where biological reactions and/or chemical reactions take place under pressure, enables to achieve 100% utilization of ozone, which renders unnecessary deozonation treatments as in the conventional sludge ozone breakdown processes.

Implementation of the present invention in the usual processes of a public sewerage facilities where biological waste water processing is performed affords the following:

1. In case of a water depth of 5 m in a conventional aeration tank using the tank water depth pressure, the average value of the tank inner pressure on account of water depth is 0.25 kg/cm², where the dissolution efficiency of the gas, when air aeration is used, is of about 0.2% (air temperature 20° C.).

On the other hand, in case of a pressurized reaction vessel according to the present invention pressurized at 5 kg/cm², under the above conditions, the dissolution efficiency of the gas reaches 10%, with an approximately 50 times increase in solution concentration (Henry's Law).

2. Under the above conditions, a 215 times oxygen solution concentration can be achieved when 90% pure oxygen is used instead of air.

3. While the Unox process, under the worldwide patents for 90% pure oxygen aeration method, was a surface aeration method, and required hence long times for oxygen dissolution; the present invention, in contrast, enables to achieve dissolution speeds higher by some tens times, and to realize reaction vessels more compact to some tenths to some hundredths consequently with great reductions in the installation spaces and the construction costs.

4. The above increase in the dissolution efficiency leads to saving of the power consumption for manufacturing oxygen and ozone to realize an effect of energy saving and cost reduction.

INDUSTRIAL APPLICABILITY

In the present invention, the mixing speed and mixing amount of a gas phase such as oxygen or the like mixed in the form of ultrafine bubbles are both greatly enhanced through the use of a pressurized reaction vessel, which dramatically promotes the biological reactions and/or chemical reactions of a reactive gas such as oxygen or the like; as a result, the invention enables the waste water treatment facilities to be substantially more compact in size, and to make it possible for pressurized reaction vessels to become implemented in the waste water treatment technology.

The invention claimed is:

1. A process of biological cleaning of waste water under pressure wherein, in a biological cleaning method of waste water in which cleaning of waste water is performed biologically by utilizing the biological waste water cleaning function of microorganism bodies by way of an oxidation reaction and/or reduction reaction, comprising: dissolving a reactive gas containing oxygen within 0.5 seconds, in part by means of a line atomizer which generates ultrasonic waves and cavitations forming bubbles with a size of 1 nm to 300 µm under pressure, in advance, and outside of a reaction vessel to be brought into a dissolved state, the remainder being dispersed and stored in the solution as fine bubbles forming a gasified solution;

introducing the gasified solution into the reaction vessel so as to feed aerobic microorganisms with the reactive gases;

the pressure in the reaction vessel is maintained such that a decreasing concentration of dissolved gas in the gasified liquid in the reaction vessel is maintained; and the microorganism bodies are rendered to exhibit the cleaning function in the reaction vessel.

2. The process of biological cleaning of waste water under pressure as described in claim 1 in which the reaction vessel is provided with support bodies having the function of increasing the habitat density of the microorganisms, holding the microorganisms and preventing flow-away loss of the microorganisms.

3. The process of biological cleaning of waste water under-pressure as described in claim 1 in which the pressure in the reaction vessel does not exceed the pressure at the outlet of the line atomizer.

4. The process of biological cleaning of waste water under-pressure as described in claim 2 in which the pressure in the reaction vessel does not exceed the pressure at the outlet of the line atomizer.

* * * * *